(12) United States Patent
Barrows

(10) Patent No.: US 10,337,794 B2
(45) Date of Patent: Jul. 2, 2019

(54) FOOD DEHYDRATOR

(71) Applicant: National Presto Industries, Inc., Eau Claire, WI (US)

(72) Inventor: Ryan H. Barrows, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 0 days.

(21) Appl. No.: 15/824,400

(22) Filed: Nov. 28, 2017

(65) Prior Publication Data

US 2018/0271122 A1 Sep. 27, 2018

Related U.S. Application Data

(63) Continuation of application No. 14/737,833, filed on Jun. 12, 2015, and a continuation of application No. 13/492,163, filed on Jun. 8, 2012.

(51) Int. Cl.

| | |
|---|---|
| *A23B 4/03* | (2006.01) |
| *A23B 7/02* | (2006.01) |
| *A23L 3/40* | (2006.01) |
| *F26B 3/04* | (2006.01) |
| *F26B 9/00* | (2006.01) |
| *F26B 9/06* | (2006.01) |
| *F26B 21/02* | (2006.01) |
| *F26B 25/18* | (2006.01) |

(52) U.S. Cl.
CPC .............. *F26B 9/003* (2013.01); *A23B 4/031* (2013.01); *A23B 7/0205* (2013.01); *A23L 3/40* (2013.01); *F26B 3/04* (2013.01); *F26B 9/066* (2013.01); *F26B 21/02* (2013.01); *F26B 25/18* (2013.01); *A23V 2300/10* (2013.01)

(58) Field of Classification Search
CPC ......... A23B 7/02; A23B 7/0205; A23B 7/022; A23B 4/03; A23B 4/031; A23B 9/08; A23B 5/02; A23B 5/022; A23L 3/40; A23V 2300/10; F26B 9/066; F26B 9/06; F26B 9/00; F26B 25/18; F26B 25/14; F26B 25/185; A23N 12/08; A01F 25/12
USPC .... 99/483; 34/192, 193, 194, 195, 196, 197, 34/198, 211, 238; 415/98; 211/188; 426/465, 443; D7/323, 347
See application file for complete search history.

(56) References Cited

U.S. PATENT DOCUMENTS

| | | | |
|---|---|---|---|
| 1,413,908 | A | 4/1922 | Green |
| 4,036,562 | A | 7/1977 | Barnes |
| 4,190,965 | A | 3/1980 | Erickson |
| 4,236,063 | A | 11/1980 | Glucksman |

(Continued)

OTHER PUBLICATIONS

Application and File History for U.S. Appl. No. 13/492,163, filed Jun. 8, 2012. Inventor: Ryan H. Barrows.

(Continued)

*Primary Examiner* — David J Laux
(74) *Attorney, Agent, or Firm* — Patterson Thuente Pedersen, P.A.

(57) ABSTRACT

Apparatus and related methods for adding increased functionality to a food dehydrator through the use of stackable drying trays that define a circulation plenum during operation and then nest within one another during disassembly so as to reduce an overall storage size of the food dehydrator. The food dehydrator can further include a base portion having a removable splash guard to prevent the introduction of liquids or solids into a mechanical space within the base portion.

4 Claims, 13 Drawing Sheets

(56) References Cited

U.S. PATENT DOCUMENTS

| | | | |
|---|---|---|---|
| D261,142 | S | 10/1981 | Erickson et al. |
| 4,380,127 | A | 4/1983 | Roberts |
| 4,457,432 | A | 7/1984 | Solheim |
| 4,536,643 | A | 8/1985 | Erickson |
| 5,215,004 | A | 6/1993 | Su |
| 5,235,906 | A | 8/1993 | Hsu |
| 5,261,168 | A | 11/1993 | Li |
| 5,311,673 | A | 5/1994 | Su |
| 5,379,527 | A | 1/1995 | Su |
| 5,420,393 | A | 5/1995 | Dornbush et al. |
| 5,423,249 | A | 6/1995 | Meyer |
| 5,437,108 | A | 8/1995 | Alseth |
| 5,454,298 | A | 10/1995 | Lu |
| 5,458,050 | A | 10/1995 | Su |
| D401,468 | S | 11/1998 | Knoll et al. |
| 5,878,508 | A | 3/1999 | Knoll et al. |
| 5,950,526 | A | 9/1999 | Hsu |
| 6,041,696 | A | 3/2000 | Su |
| 6,085,442 | A | 7/2000 | Erickson |
| D445,295 | S | 7/2001 | Su |
| 7,159,510 | B2 | 1/2007 | LaMaster et al. |
| 8,684,661 | B2 | 4/2014 | Horng et al. |
| 2007/0102386 | A1 | 5/2007 | Killinger et al. |
| 2009/0321410 | A1 | 12/2009 | Moon |
| 2013/0326902 | A1 | 12/2013 | Barrows |
| 2015/0272199 | A1 | 10/2015 | Barrows |

OTHER PUBLICATIONS

Application and File History for U.S. Appl. No. 14/737,833, filed Jun. 12, 2015. Inventor: Ryan H. Barrows.

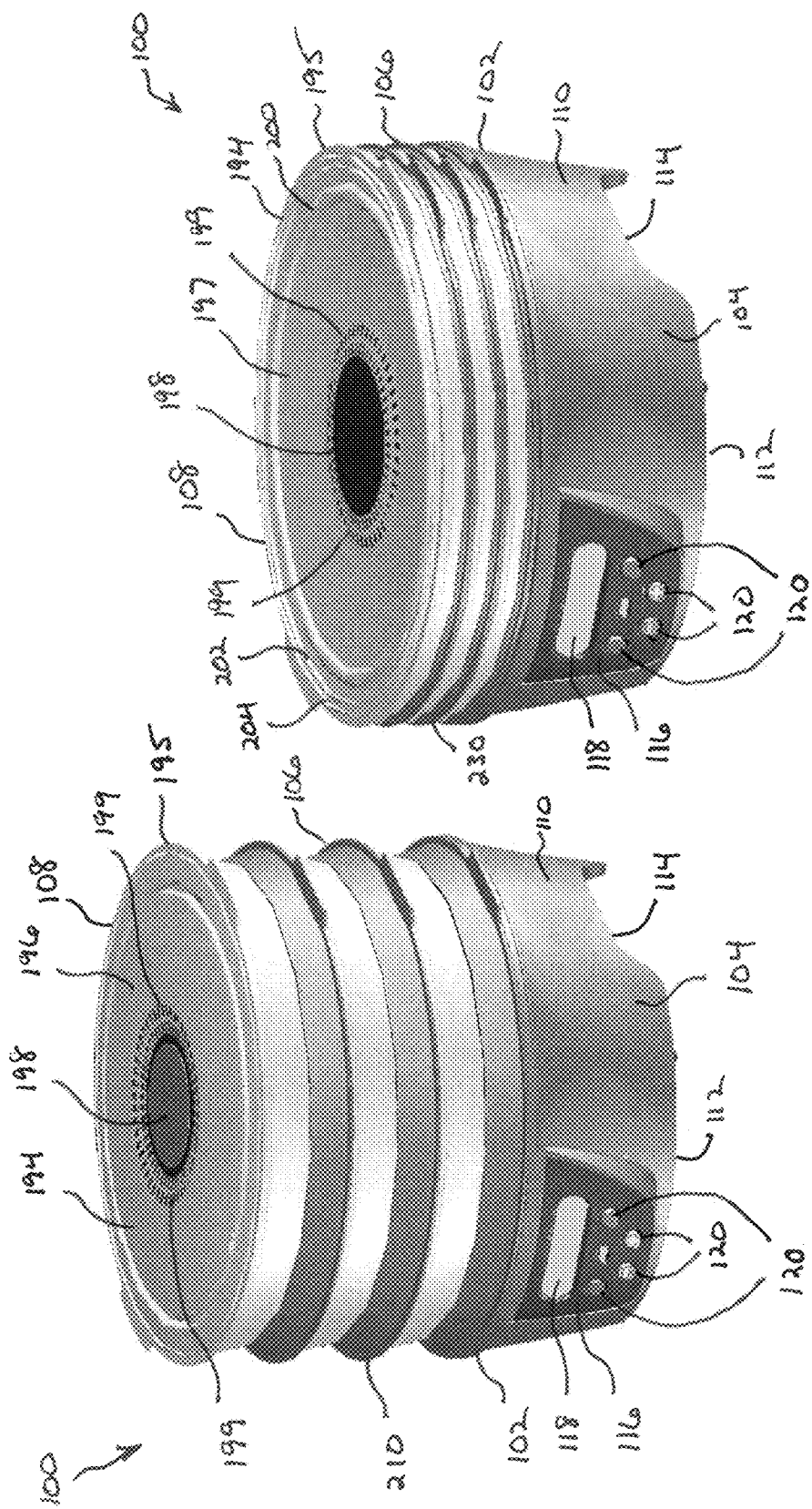

FOOD DEHYDRATOR

RELATED APPLICATIONS

This application is a continuation of application Ser. No. 13/492,163 filed Jun. 8, 2012, and this application is a continuation of application Ser. No. 14/737,833 filed Jun. 12, 2015, each of which is hereby fully incorporated herein by reference.

FIELD OF THE INVENTION

The present invention is related generally to food dehydrators. More specifically, the present invention is related to a food dehydrator having stackable dehydrating trays configured to increase safety and reduce a storage footprint of the food dehydrator.

BACKGROUND OF THE INVENTION

The advantages of food dehydrating are well known and various methods of dehydrating food have been practiced for hundreds of years. Generally, the process of dehydrating food involves the removal of water from food so as to inhibit the growth of microorganisms and bacteria. In this manner, the process of food dehydration provided a method for people to preserve food for extended periods prior to consumption before the use of refrigeration or chemical preservative agents became common and well known.

Currently, a variety of consumer style food dehydrator products are available from suppliers including Nesco, Ronco and Aroma. Generally, these consumer style food dehydrator products remove water from food by recirculating heated air above and below food placed on trays in a drying chamber. Depending upon the amount of food and type of food placed in the drying chamber, consumer style food dehydrator products can accomplish the water removal in timeframes of between 1-12 hours.

While the dehydrating process is well known and a variety of consumer products are readily available, it would be advantageous to improve upon the existing products through the use of designs that simplify loading, unloading and storage of a food dehydrator. Furthermore, it would be advantageous to incorporate additional features so as to increase the service life and overall safety of the food dehydrator.

SUMMARY OF THE INVENTION

A representative embodiment of a food dehydrator according to the present invention provides increased functionality through the use of stackable drying trays that define a circulation plenum during operation and then nest within one another during disassembly so as to reduce an overall storage size of the food dehydrator. The food dehydrator can further include a base portion having a removable splash guard to prevent the introduction of liquids or solids into a mechanical space within the base portion.

In one aspect of the present invention, a food dehydrator can comprise a plurality of tray levels upon which food can be placed for drying. Generally, the plurality of tray levels is defined by stacking an alternating arrangement of carrying and second trays. When arranged to define the tray levels during drying, the carrying and second trays cooperatively define an air supply plenum extending up a circumferential perimeter of a tray portion so as to efficiently direct air across each tray level for even heat distribution throughout the food dehydrator. Airflow directed across each level can then be directed downward or upward through a central aperture on each of the carrying and second trays, where a portion of the airflow can be exhausted out a lid portion and a portion of the airflow can be redirected into a base portion of the food dehydrator for reheating. When a drying process has been completed, the carrying and second trays can be arranged in a nested orientation such that a storage height for the food dehydrator is significantly reduced as compared to an operational height during dehydrating.

In another aspect of the present invention, a food dehydrator can comprise a base portion that supports a plurality of stacked trays for placing food during a drying operation. The base portion can define a mechanical space enclosing a fan assembly and a heater assembly for supplying heated air flow across the plurality of stacked trays. The base portion can include an upper base surface having a central aperture for allowing a return air flow back into the mechanical space for venting and/or reheating. The base portion can include a projecting guard member over the central aperture to prevent the entry of large objects into the mechanical space that could lead to injury or prevent proper operation of the fan assembly and heater assembly. A removable splash guard can be positioned over the projecting guard member to prevent liquids or smaller objects from entering the mechanical space. The removable splash guard can be removed from above the upper base surface whereby a user can easily clean the removable splash guard.

In yet another aspect of the present invention, a food dehydrator can utilize a fan wheel that promotes uniformity and efficiency within the food dehydrator. The fan wheel can comprise a floor including a solid portion acting as a barrier to prevent a motor from being exposed to liquids or solids. The fan wheel can have top and bottom sides, each having impeller blades with specified heights to promote performance for both fresh and returning air streams.

In yet another aspect of the present invention, a method for reducing a storage height for a food dehydrator can comprise changing the food dehydrator from a dehydrating configuration to a storage configuration. The method can further comprise turning one or more carrying trays upside down such that channels on each carrying tray can nest into corresponding channels on a base portion and one or more second trays.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which:

FIG. 1 is a front perspective view of a food dehydrator in a dehydrating configuration according to a representative embodiment of the present invention.

FIG. 2 is a front perspective view of the food dehydrator of FIG. 1 in a storage configuration.

Figure 3:
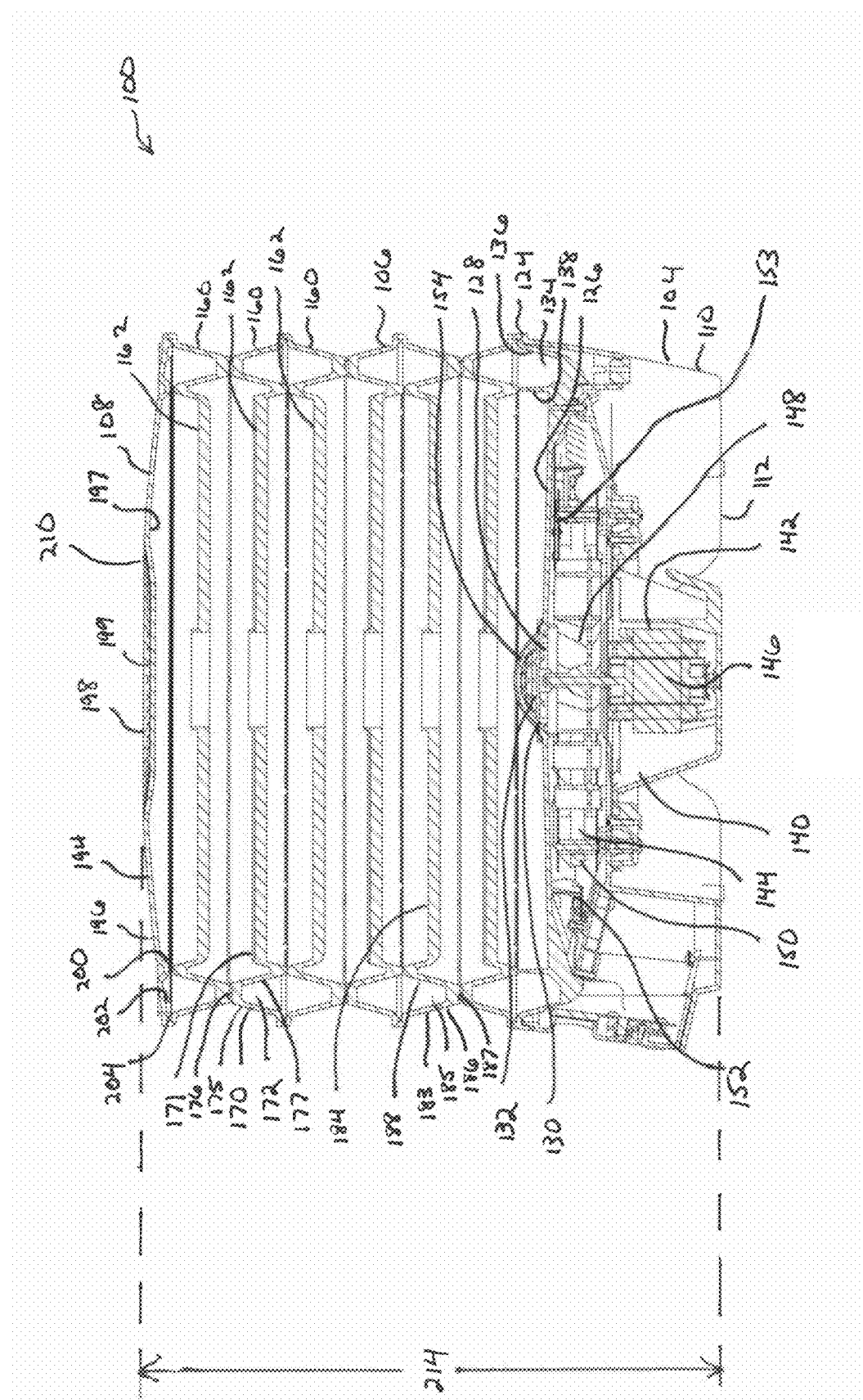
FIG. 3 is a section view of the food dehydrator of FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring to FIGS. 1 and 2, a representative embodiment of a food dehydrator 100 of the present invention can comprise a dehydrator body 102 defined by a base portion 104, a tray portion 106 and a cover portion 108. Dehydrator body 102 is generally formed of materials suited for contact with food and also provide for easy clean up and sanitizing following usage and prior to storage. In some embodiments, dehydrator body 102 is formed of polymeric materials such as, for example, polypropylene, metals such as stainless steel and aluminum or combinations of polymeric and metallic materials. Dehydrator body 102 is preferably fabricated with lightweight materials such that the food dehydrator is easily transportable.

As illustrated in FIGS. 1, 2, 3, 4 and 5, base portion 104 is generally defined by a circular perimeter wall 110 and a bottom surface 112. Within the circular perimeter wall 110, bottom surface 112 rises up at a pair of opposed gripping areas 114 so as to provide gripping and lifting access to a user for lifting and moving the base portion 104 and consequently the food dehydrator 100. In addition, opposed gripping areas 114 provide openings for incoming air as will be subsequently discussed. A control panel 116 is provided on a front portion of the circular perimeter wall 110. The control panel 116 can include a display screen 118 and control buttons 120 for alternatively controlling variables such as dehydrating temperature or timer settings. Circular perimeter wall 110 terminates at an upper wall surface 124 upon which is mounted an upper base surface 126 having a central aperture 128 and a upwardly projecting guard member 130 defined by a plurality of blades 132. Upper base surface 126 includes a perimeter channel 134 defined between a circumferential outer wall 136 and a circumferential inner wall 138. A mechanical space 140 is defined inside the base portion 104. Mounted within the mechanical space 140 are a fan assembly 142 and a heater assembly 144. Fan assembly 142 includes a motor 146 and a fan wheel 148. Heater assembly 144 includes a resistive heating element 150, a temperature sensor 152 and a thermal cutout switch 153. A removable splash guard 154 is mounted over the central aperture 128 and the projecting guard member 130. Removable splash guard 154 can comprise a tight mesh intended to prevent the introduction of liquids or solids into the mechanical space 140 through the central aperture 128. The removable nature of removable splash guard 154 allows for it to be cleaned as necessary. In the event that the removable splash guard 154 was lost, projecting guard member 130 physically blocks the introduction of larger physical items from entering the mechanical space 140 so as to prevent potential unsafe interactions. Furthermore, the positioning of fan wheel 148 above the motor 146 functions as a barrier that shelters the motor from ingression of solids or liquids through the central aperture 128.

Figure 4:
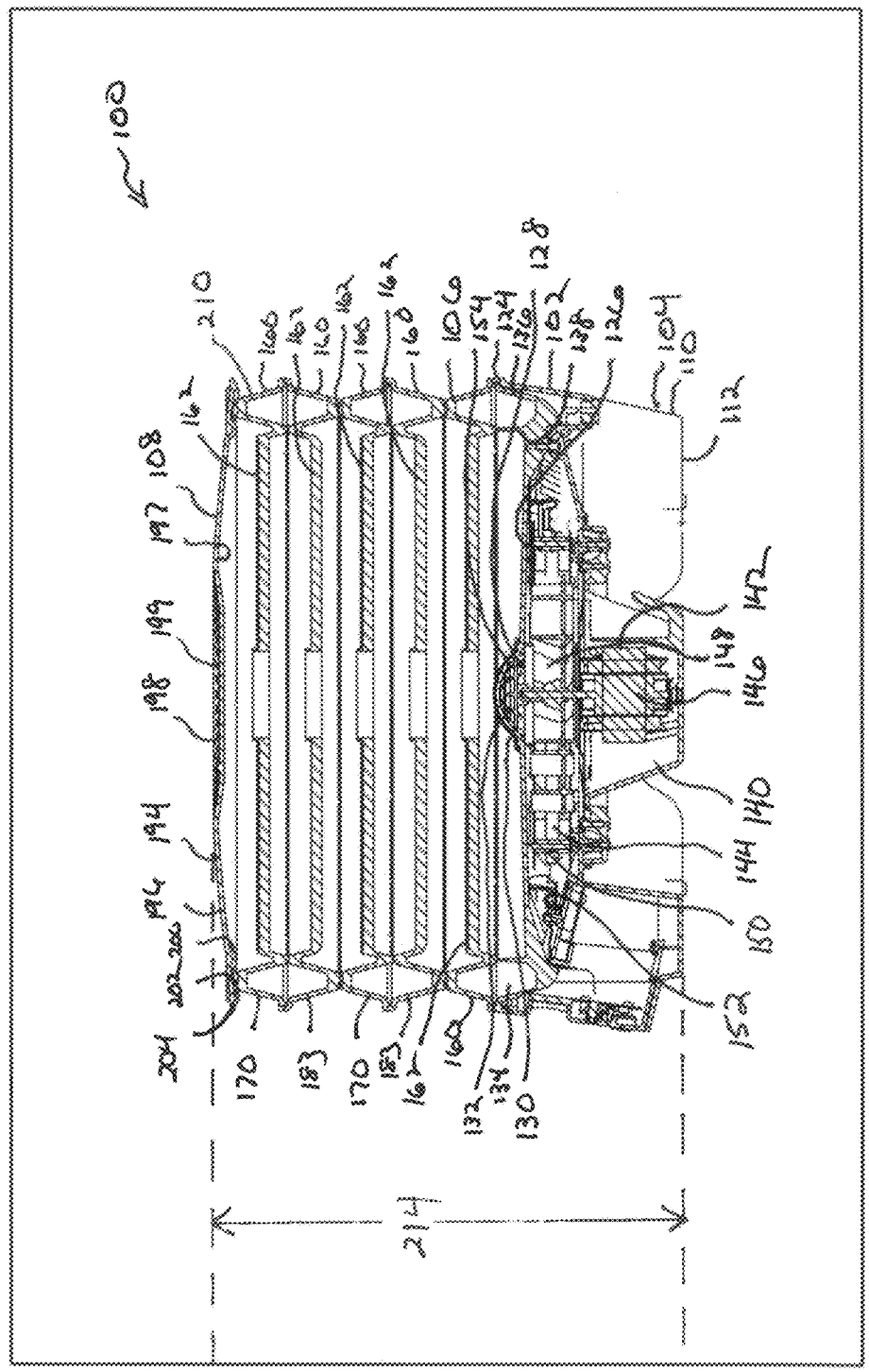
FIG. 4 is a section view of an embodiment of a food dehydrator in a dehydrating configuration according to a representative embodiment of the present invention.
Figure 10:
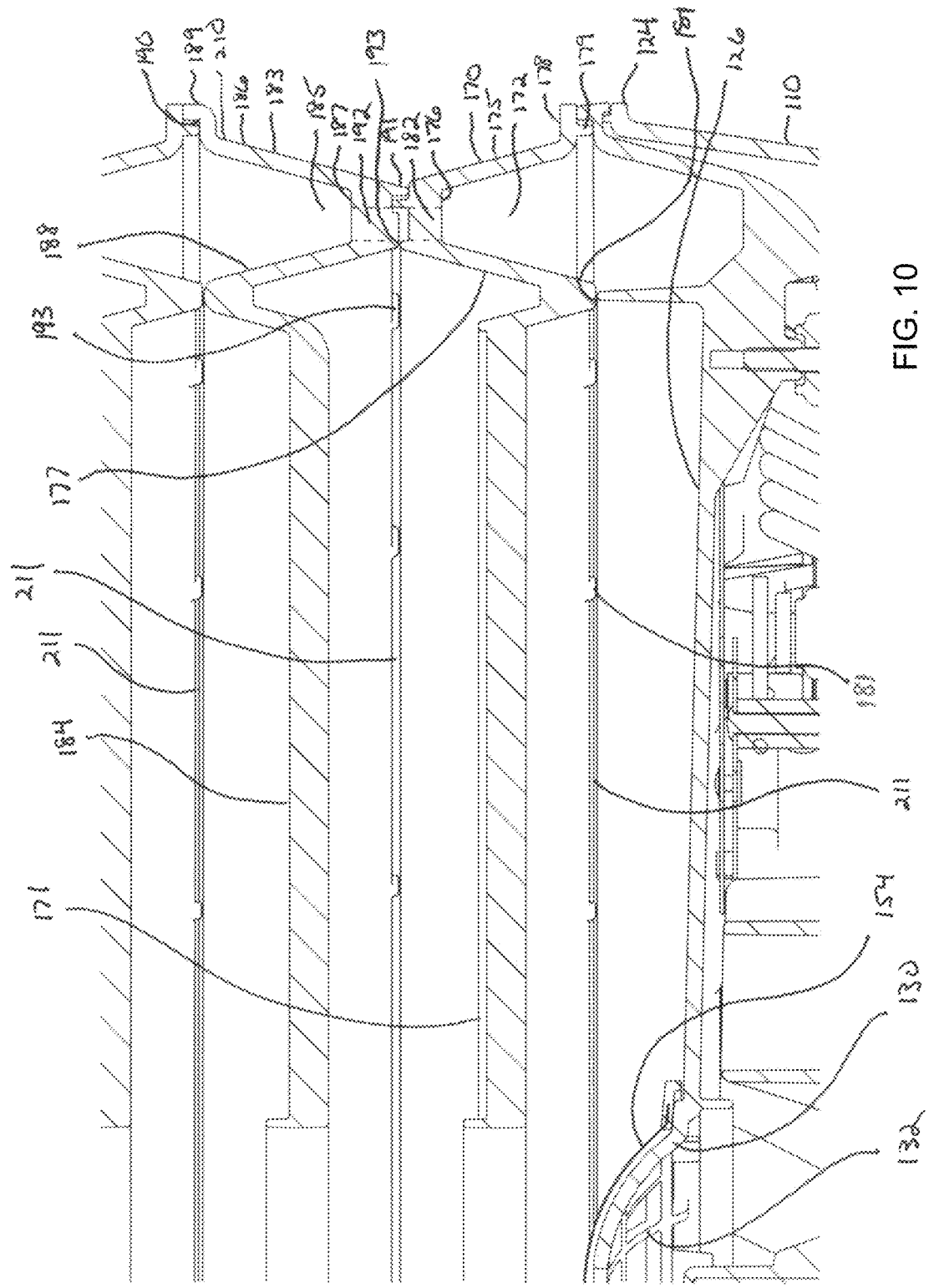
FIG. 10 is a detailed section view of a portion of the food dehydrator of FIG. 1.

As illustrated in FIGS. 1, 2, 3 and 4, tray portion 106 generally comprises a plurality of individually stacked trays 160 so as to define a plurality of distinct tray levels 162. As shown in FIGS. 1, 3 and 10, six tray levels 162 are illustrated though depending upon the amount of food to be dehydrated while FIG. 4 illustrates five tray levels 162. Depending upon the amount and types of food being dehydrated, food dehydrator 100 can include as few as one tray level 162 up to a maximum of twelve tray levels 162 in tray portion 106.

Referring to FIGS. 6, 7, 8 and 9, trays 160 share some common features but also comprise two distinct arrangements that provide for advantages during both operation and storage of the food dehydrator 100. Each tray 160 generally comprises a circular perimeter 164 encompassing a food support surface 166 and a central tray aperture 168. The food support surface 166 is not a continuous surface but instead defines a plurality of openings 169 or perforations arranged through the food support surface 166.

Differences amongst the trays 160 are generally found proximate the circular perimeter 164. For instance, a carrying tray 170 as illustrated in FIGS. 3, 4, 6, 7, 10, 11 and 12 generally comprises an upper surface 171 having a downward facing channel 172 at the circular perimeter 164 as well as a pair of opposed tray handles 174a, 174b projecting outwardly from the circular perimeter 164. Downward facing channel 172 is defined by an exterior surface 175, an upper channel surface 176 and an interior surface 177. Exterior surface 175 terminates at a horizontal surface 178 including a downward facing projection member 179. Upper channel surface 176 includes a continuous radial projecting member 180 and a plurality of spaced apart upper surface apertures 182. A plurality of spaced apart standoffs 181 project downward from a lower portion of interior surface 177. Standoffs 181 are generally spaced equally about a circumference of the interior surface 177 and can be arranged, for example, every 20°, 30° or 45° about the circumference of the interior surface 177.

As illustrated in FIGS. 3, 4, 8, 9, 10, 11 and 12, a second tray 183 generally comprises an upper surface 184 having an upward facing channel 185 at the circular perimeter 164. Upward facing channel 185 is defined by an exterior surface 186, a lower channel surface 187 and an interior surface 188. Exterior surface 186 terminates at a vertical surface 189 defining a flanged receiving portion 190. Lower channel surface 187 includes a continuous radial projecting member 191 and a plurality of spaced apart lower surface apertures 192. Lower channel surface 187 further comprises a plurality of spaced apart standoffs 193 that project downward from a lower portion of interior surface 188. Standoffs 193 are generally spaced equally about a circumference of the interior surface 188 and can be arranged, for example, every 20°, 30° or 45° about the circumference of the interior surface 188.

As illustrated in FIGS. 1, 2, 3, 4 and 5, cover portion 108 generally comprises a lid 194 having a circular lid perimeter 195. Lid 194 generally comprises a top surface 196, a bottom surface 197 and a central venting portion 198. Central venting portion 198 generally comprises a plurality of apertures 199. Bottom surface 197 further comprises a downwardly extending circumferential channel 200 and downward radial projecting members 202 and 204.

Figure 11:
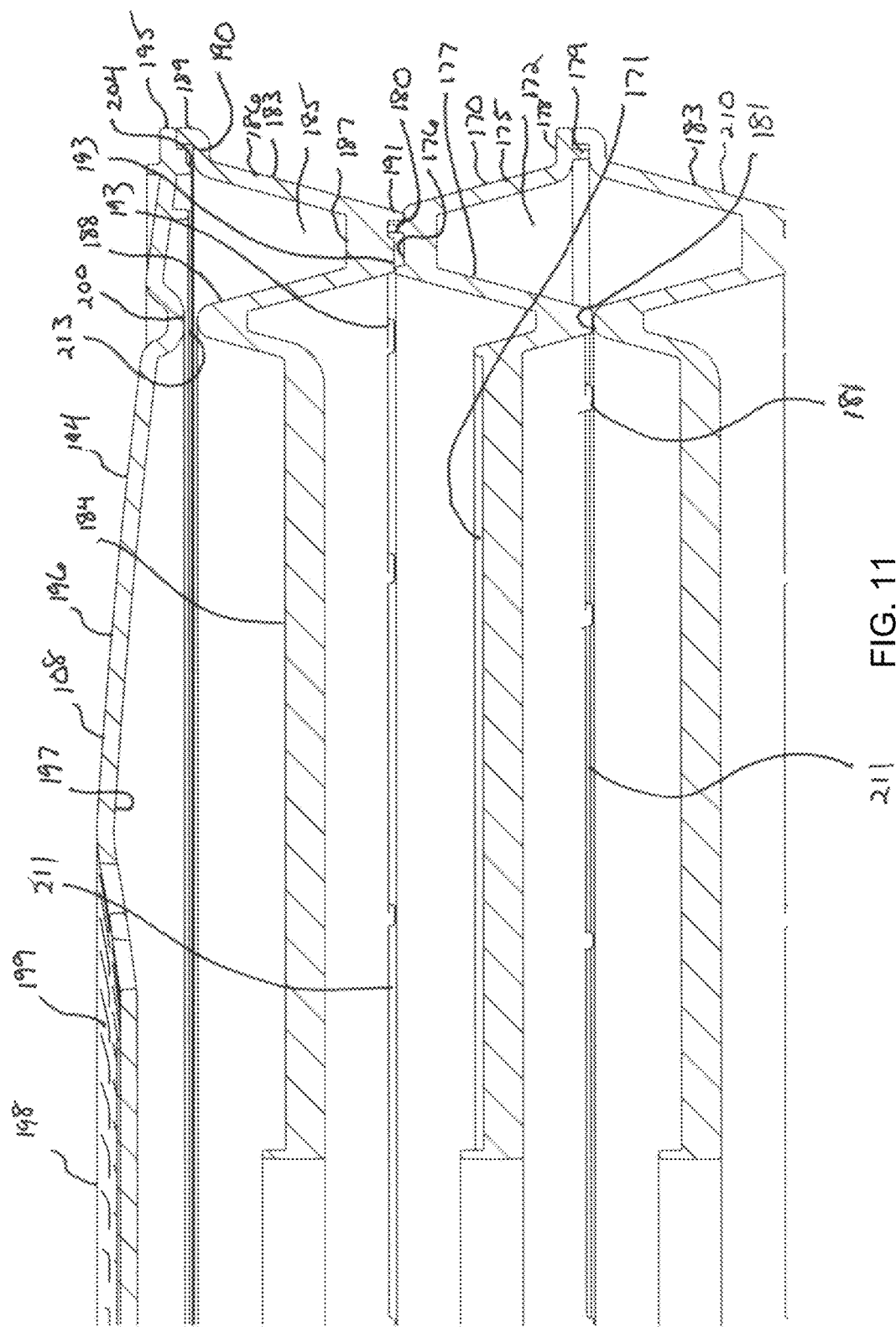
FIG. 11 is a detailed section view of a portion of the food dehydrator of FIG. 1.
Figure 12:
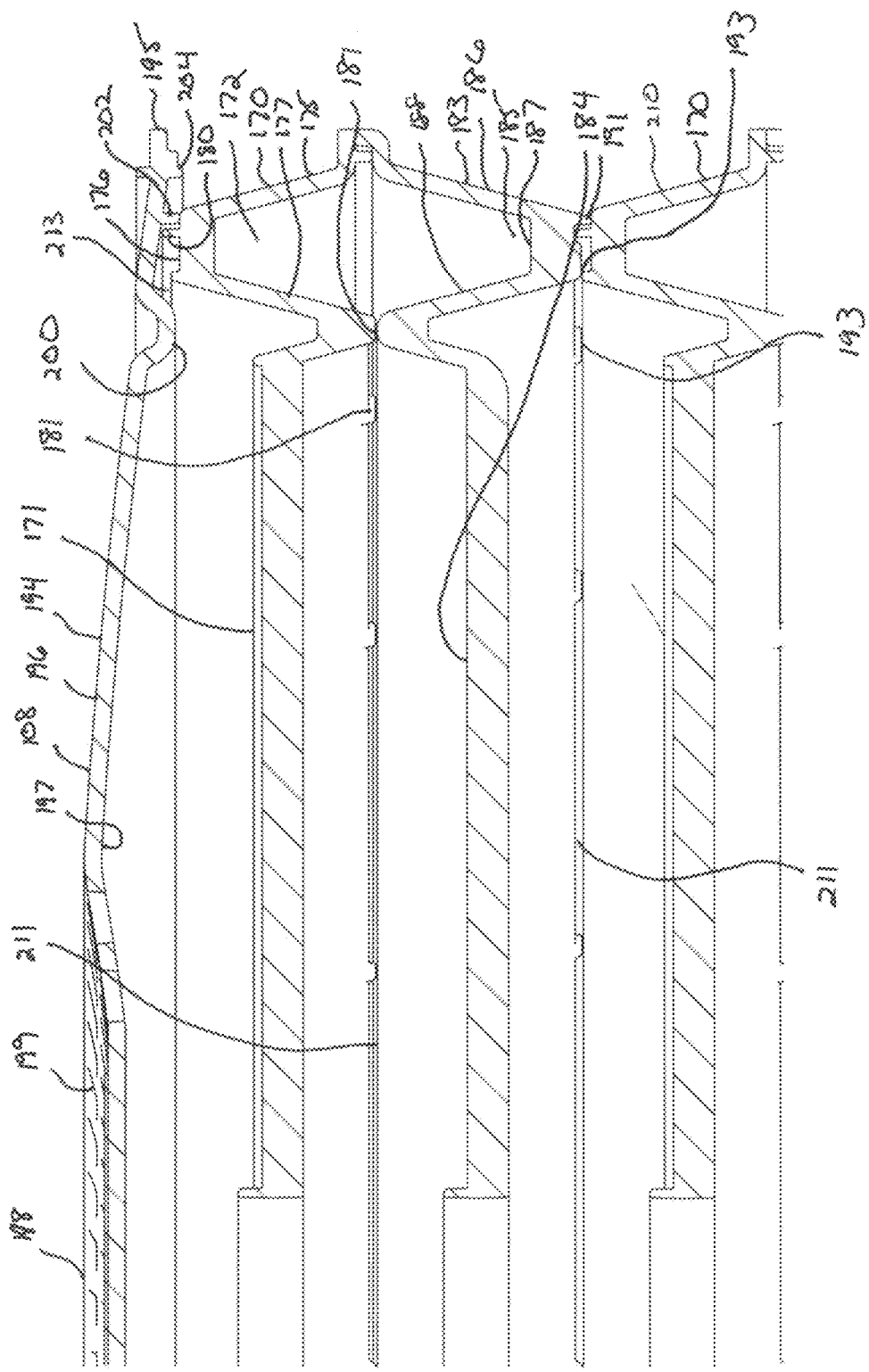
FIG. 12 is a detailed section view of a portion of the food dehydrator of FIG. 4.
Figure 13:
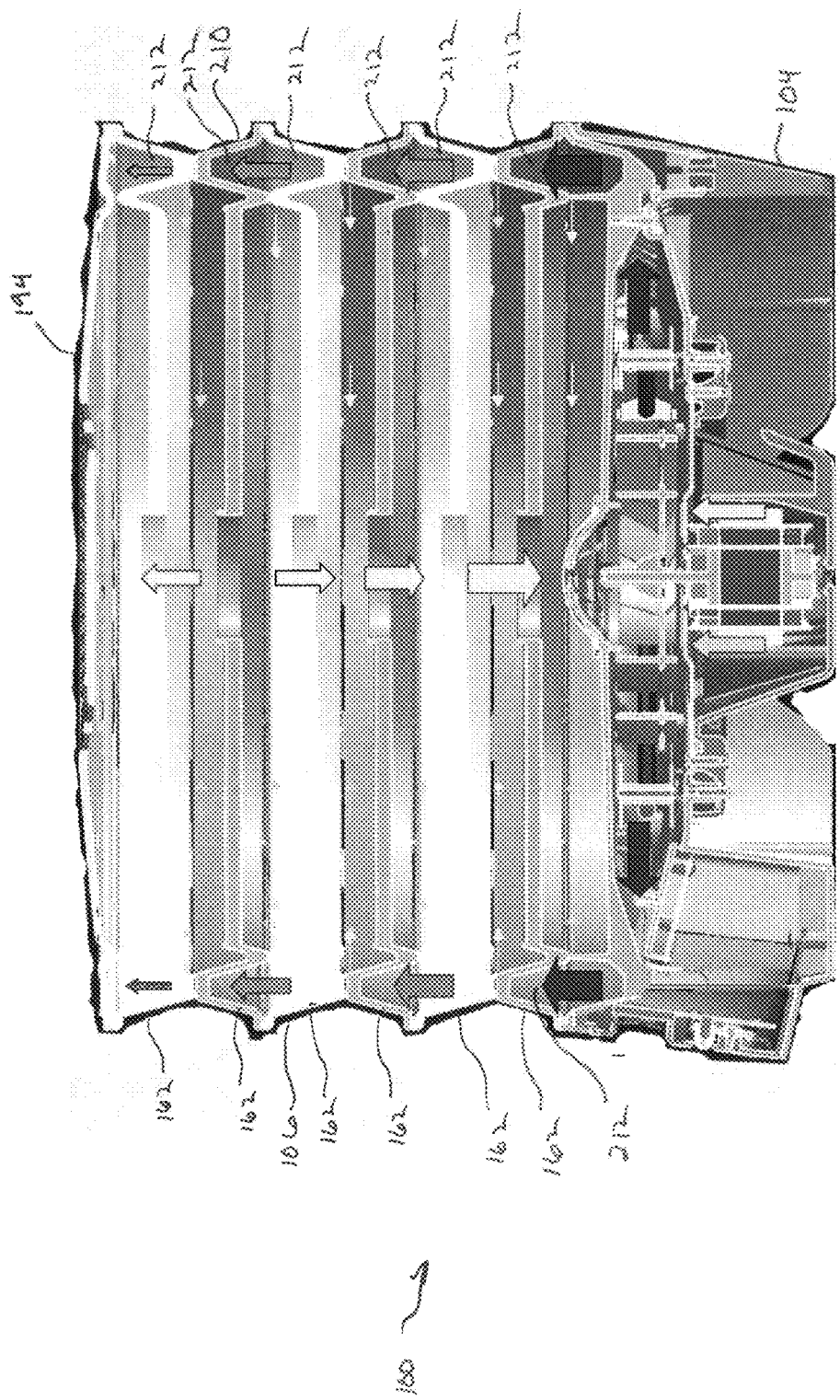
FIG. 13 is a schematic section view of the food dehydrator of FIG. 1.

Food dehydrator 100 is used by first assembling the food dehydrator 100 into a dehydrating configuration 210 as shown fully in FIGS. 1, 3, 4 and 13 and partially in FIGS. 10, 11 and 12. Generally, base portion 104 is placed on a generally flat surface such as, for example, a countertop or table. Next, a user decides how many tray levels 162 are required based upon the amount and types of food to be dehydrated. Once the user determines the number of tray levels 162 to be utilized, the user positions a carrying tray 170 above the upper base surface 126 such that the perimeter channel 134 and downward facing channel 172 are aligned and cooperatively define an air supply plenum 212 as the carrying tray 170 is lowered onto the base portion 104. The downward facing projection member 179 interfaces with the circumferential outer wall 136 for alignment purposes and to promote retention of the carrying tray 170 on the base portion 104. If only a single tray level 162 is required, the user would then position the food to be dehydrated on the food support surface 166 of the carrying tray 170. If instead, additional tray levels 162 were required, the user would then position second tray 183 on top of the carrying tray 170. When second tray 183 is positioned on carrying tray 170, the addition of another carrying tray 170 on top of the second tray 183 results in downward facing projection member 179 residing within flanged receiving portion 190 and continuous radial projecting member 180 interfacing with the continuous radial projecting member 191 to position, retain and provide stability to the tray portion 106 as the carrying trays 170 and second trays 183 are stacked. Based on the number of tray levels 162 desired, the user would alternate the positioning of carrying tray 170 and second tray 183 until the desired number of tray levels 162 is achieved. As carrying tray 170 and second tray 183 are alternatingly stacked, the air supply plenum 212 is defined upwardly along the circumferential exterior of the tray portion 106 by the interaction of the upward facing channel 185 and lower surface apertures 192 of the second tray 183 and the downward facing channel 172 and upper surface apertures 182 of the carrying tray 170. During stacking of the carrying tray 170 and second tray 183, the interaction of the spaced apart standoffs 181 and 193 serve to define a plurality of duct slots 211 defined between standoffs 181 and 193 at each level of interaction between carrying trays 170 and second trays 183. With the desired number of tray levels 162 defined above the base portion 104, the user then positions the lid 194 on the upper most tray level 162 to enclose the tray portion 106 and air supply plenum 212. Regardless of whether the upper most tray level 162 comprises a carry tray 170 or second tray 183, the downwardly extending circumferential channel 200 approaches an upper most portion of the air supply plenum 212 so as to leave an upper level air gap 213 as shown in FIGS. 11 and 12. When the upper most tray level 162 is defined by carrying tray 170 as illustrated in FIGS. 4 and 12, downwardly extending circumferential channel 200 approaches the upper channel surface 176 while the downward radial projecting members 202 interfaces with the continuous radial projecting member 180. When the upper most tray level 162 is defined by second tray 183 as illustrated in FIGS. 1, 3, 11 and 13, downwardly extending circumferential channel 200 approaches the interior surface 188 while the downward radial projecting member 204 interfaces with the flanged receiving portion 190. In this manner, lid 194 is attached and remains positioned on the base portion 104 regardless of whether or not the upper most tray level 162 comprises carrying tray 170 or second tray 183. When food dehydrator 100 is fully assembled into dehydrating configuration 210, food dehydrator has a dehydrating height 214 as illustrated in FIG. 4 with respect to a configuration having five tray levels 162 and a configuration having six tray levels as shown in FIG. 3. It will be understood that dehydrating height 214 will vary depending upon the number of tray levels 162 being utilized.

Following assembly of the food dehydrator 100 into dehydrating configuration 210 and placement of the food to be dehydrated on the tray levels 162, the user then initiates the dehydrating process utilizing the control buttons 120 to select a dehydrating temperature and a timer period. With the dehydrating process initiated, power is supplied to the heater assembly 144 and the fan assembly 142 begins circulating hot air from the base portion 104 to the tray portion 106. Typically, the heater assembly will maintain air temperature at the user selected temperature or the thermostat calibration point. As illustrated by the arrows within the FIG. 13, hot air is directed up the air supply plenum 212. The heated air moving up the air supply plenum 212 is directed through the spaced arrangement of upper surface apertures 182 and lower surface apertures 192. Backpressure within the air supply plenum 212 results in approximately equal amounts of heated air being directed horizontally though the duct slots 211 at the various tray levels 162. As the air is directed horizontally through the duct slots 211 and across the food support surface 166, the heated air interacts with the food. As the heated air encounters food, air can move upwards or downwards across the tray levels 162 through the openings 169 in the food support surface. In this way, temperature uniformity is maintained throughout the various levels 162 of the tray portion 106 such that even when fully loaded, the minimum temperature at any of tray levels 162 is 140° F. at thermal stabilization when operating on a highest temperature setting. Ultimately, the heated air reaches the central tray aperture 168 whereby a portion is directed up and out the central venting portion 198 of lid 194 and a portion is directed downward through the central aperture 128 of the upper base surface 126 where the air is reheated and recirculated with the heater assembly 144 and the fan assembly 142. Moisture removed from the food is continuously vented with the air out the central venting portion 198. Fresh make up air is continually drawn into the base portion 104 through the gripping areas 114.

Once the dehydrating process is complete, the user simply grasps the opposed tray handles 174a, 174b on one of the carrying trays 170 to lift the carrying tray 170 and any of the above located tray levels 162 to a desired location for unloading the dehydrated food. The physical interaction that allows for retention and stacking of the carrying trays 170 and the second trays 183 also allows for them to be carried and transported without risk of separation. Therefore, a user can grab the tray handles 174a, 174b on the lowest carrying tray 170 if the user wishes to carry the entire tray portion 106 or alternatively, the user can grasp the tray handles 174a, 174b of any above located carrying tray 170 if the user only desires to transport a portion of the tray portion 106. With the tray portion 106 located in a desired area, the user simply lifts the lid 194 and sequentially unloads and lifts off the alternating tray levels 162. Following unloading of the tray levels 162, lid 194, carrying trays 170 and second trays 183 can be cleaned by hand or within a conventional dishwasher.

Figure 5:
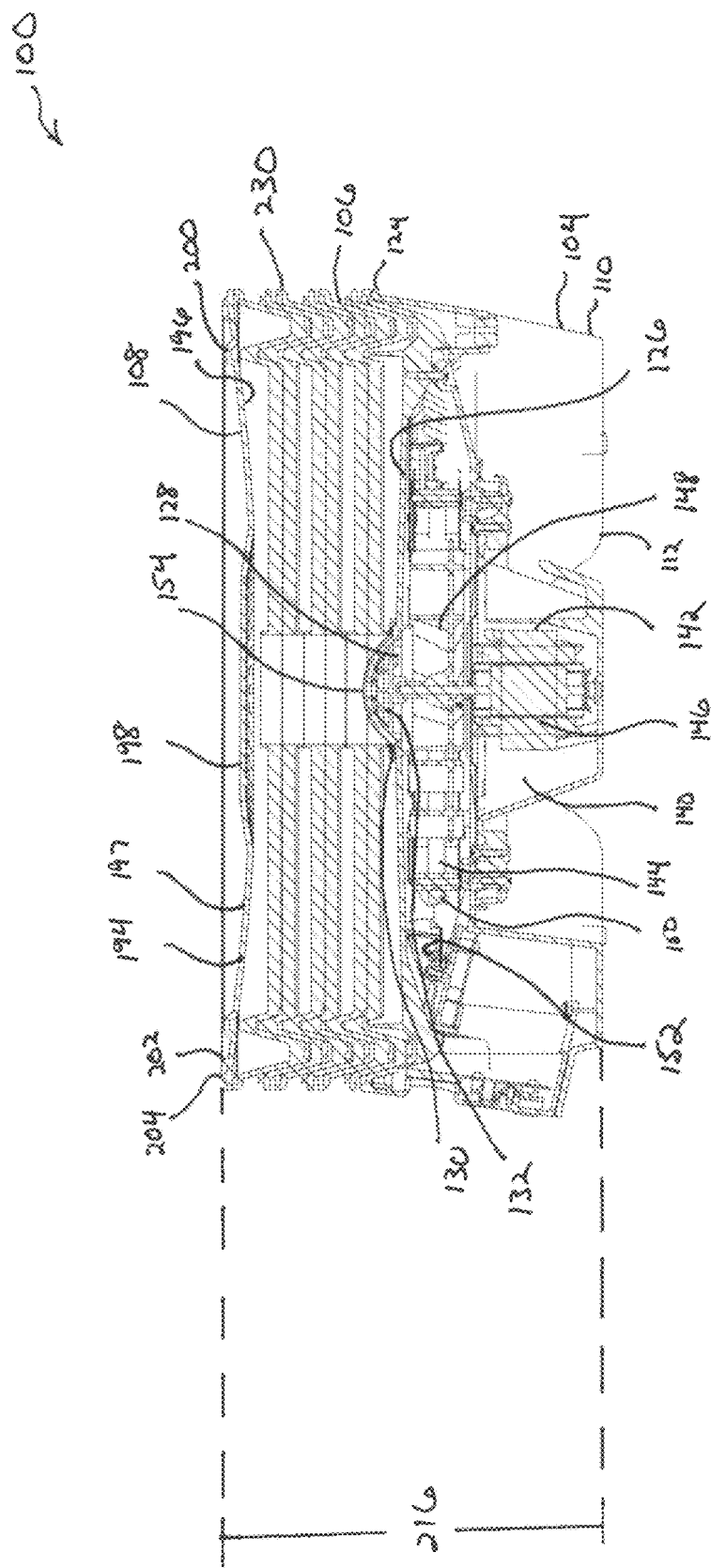
FIG. 5 is a section view of the food dehydrator of FIG. 2.
Figure 6:
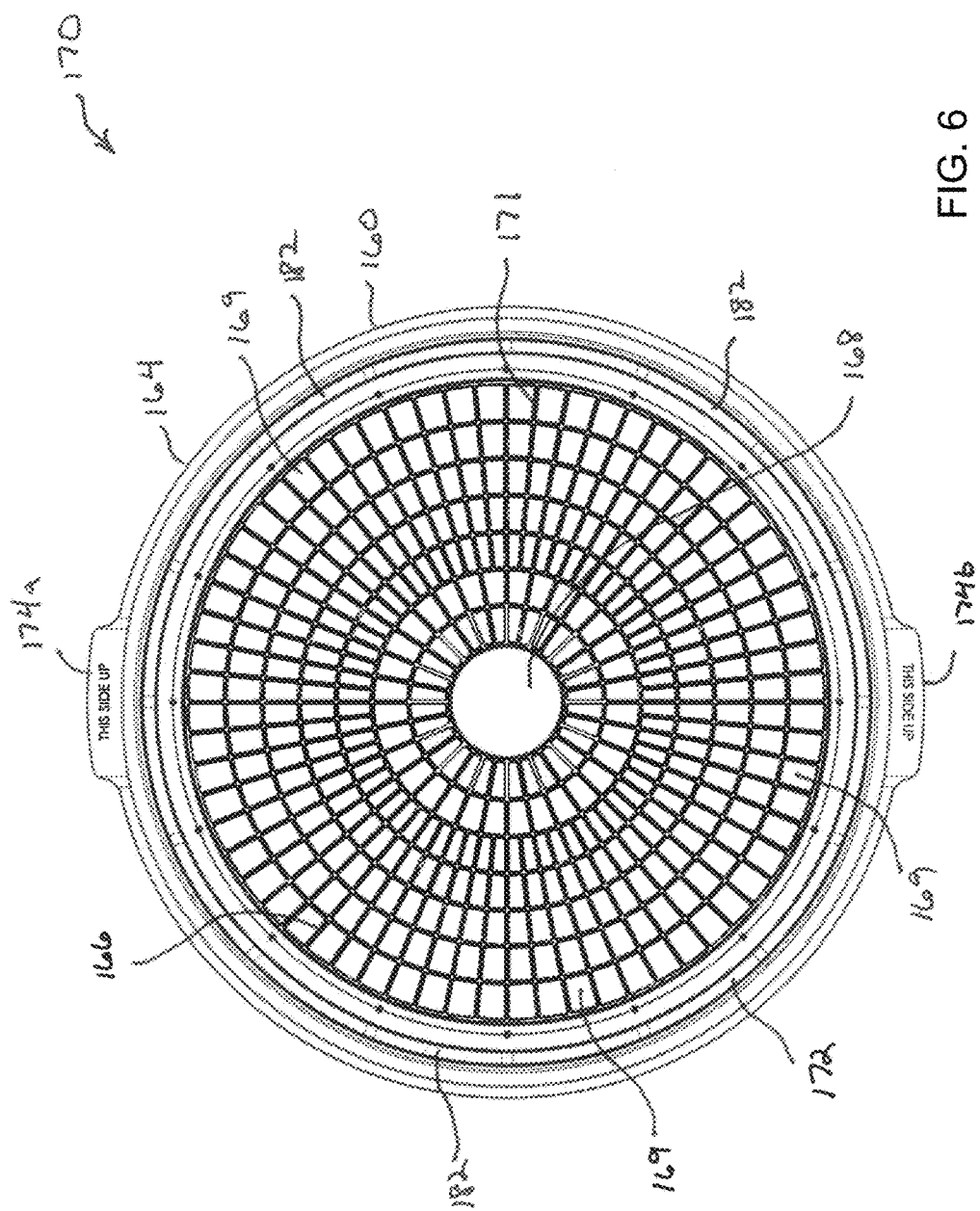
FIG. 6 is a top view of a carrying tray according to an embodiment of the present invention.
Figure 7:
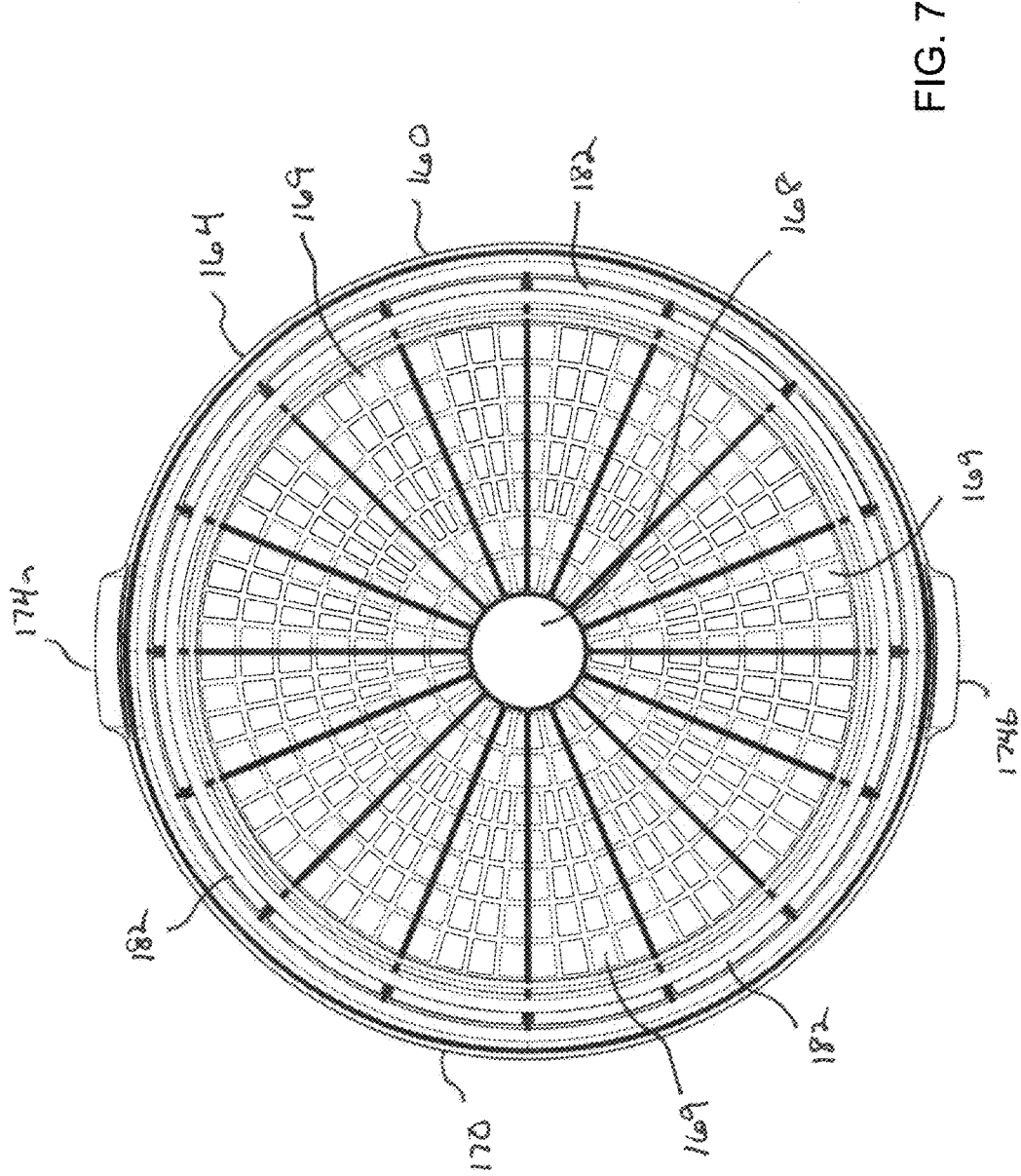
FIG. 7 is a bottom view of the carrying tray of FIG. 6.
Figure 8:
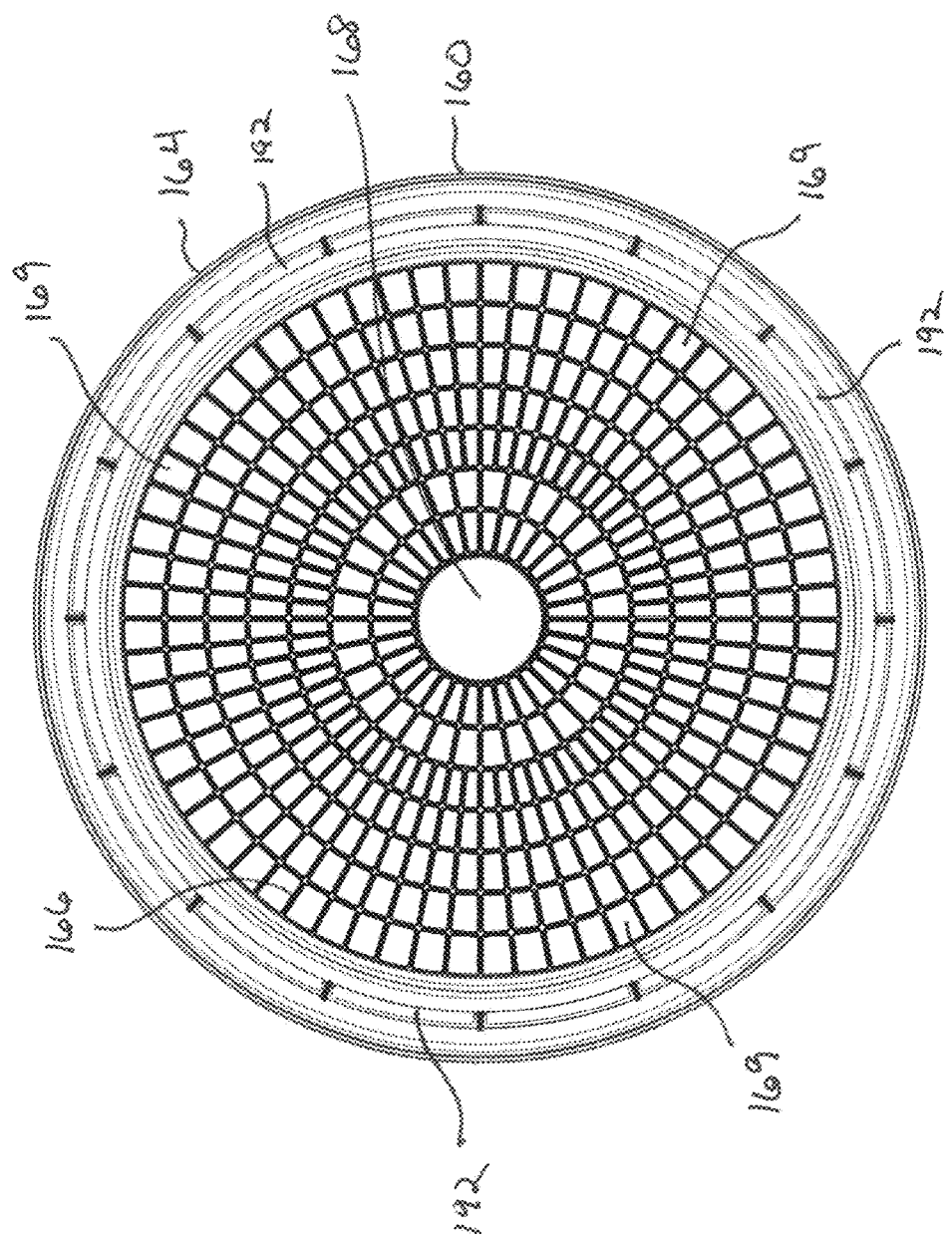
FIG. 8 is a top view of a second tray according to an embodiment of the present invention.
Figure 9:
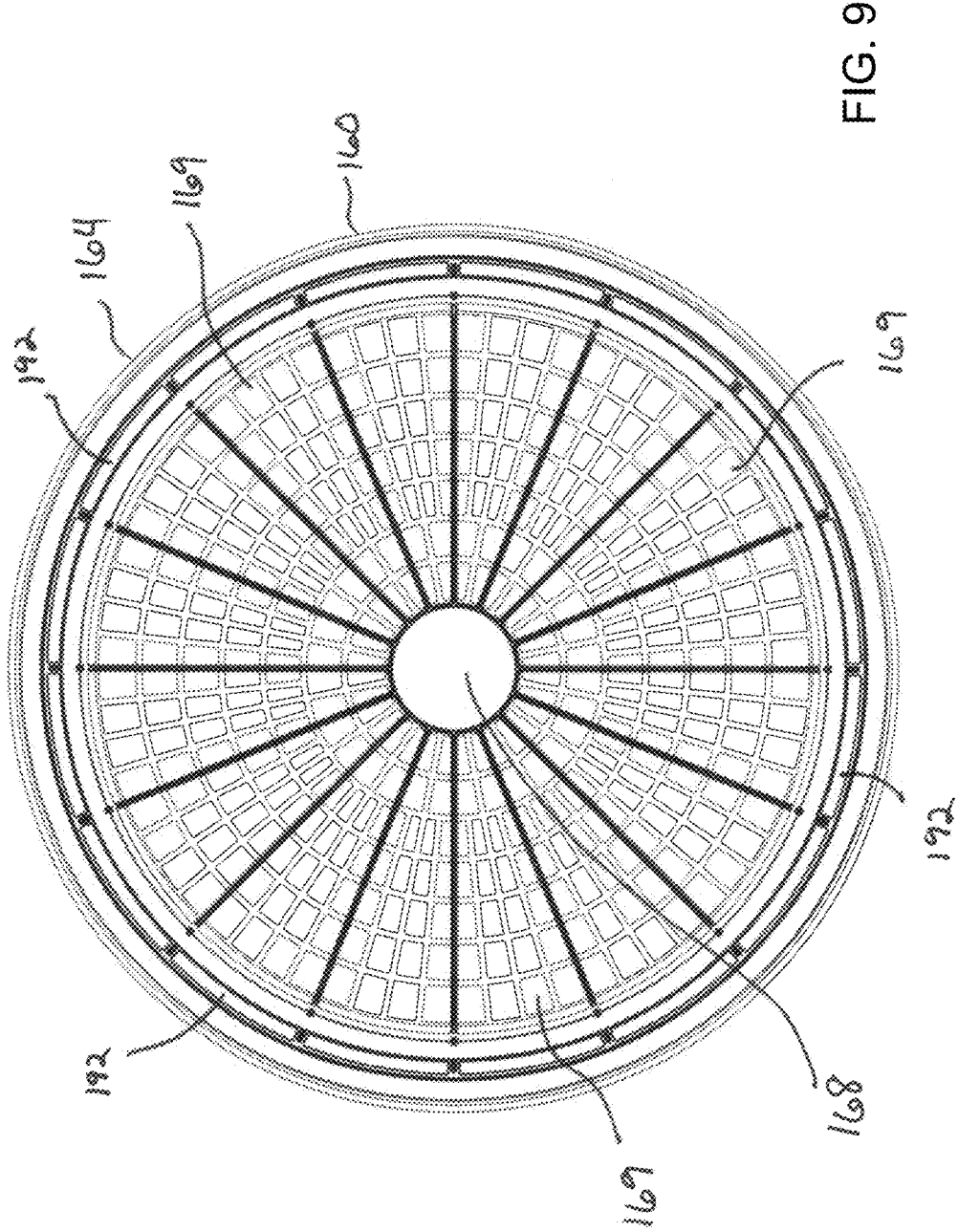
FIG. 9 is a bottom view of the second tray of FIG. 8.

Following cleaning of the food dehydrator 100, the carrying trays 170 and second trays 183 can be arranged to form a storage configuration 230 as shown in FIGS. 2 and 5. Generally, all of the carrying trays 170 are flipped upside down such that the downward facing channel 172 is inverted and can be placed substantially within either the perimeter channel 134 of upper base surface 126 or the upward facing channel 185 of second tray 183. In this manner, the upside down carrying trays 170 and second trays 183 nest within one another and thereby substantially reduced the overall storage height necessary for storage of the food dehydrator 100. When food dehydrator 100 has been placed into dehydrating configuration 210, food dehydrator has a storage height 216 as illustrated in FIG. 5 with respect to a configuration having six nested trays 160. It will be understood that storage height 216 will vary depending upon the number of carrying trays 160 that are nested together. When positioned in storage configuration 230, storage height 216 of the food dehydrator 100 is reduced as compared to a dehydrating height 214 for configurations utilizing the same number of trays 160 as contained in Table 1 below.

TABLE 1

Representative height differences from Dehydrating Configuration to Storage Configuration

| Number of Trays | Dehydrating Height (inches) | Storage Height (inches) | Height Reduction from Dehydrating Configuration to Storage Configuration |
|---|---|---|---|
| 4 | 9.73 | 6.18 | 36% |
| 6 | 12.13 | 6.95 | 43% |
| 12 | 19.33 | 9.25 | 52% |

Figure 14:
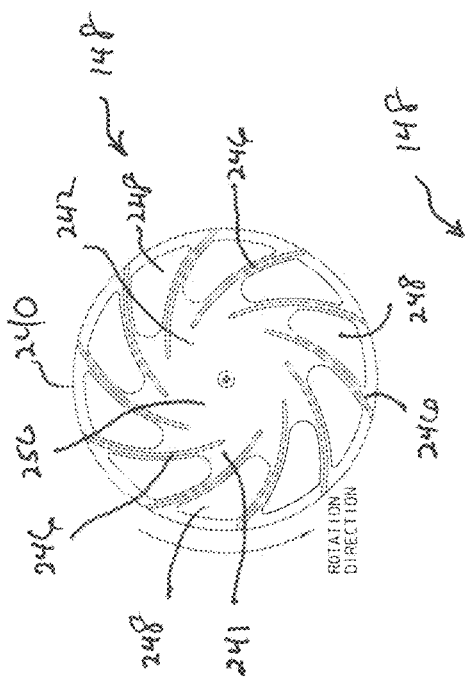
FIG. 14 is a top view of a fan wheel according to a representative embodiment of the present invention.
Figure 15:
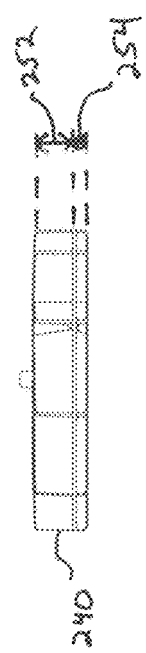
FIG. 15 is a side view of the fan wheel of FIG. 14.
Figure 16:
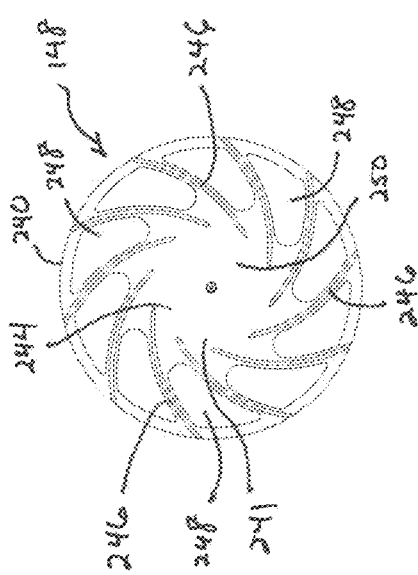
FIG. 16 is a bottom view of the fan wheel of FIG. 14.

Referring to FIGS. 14, 15 and 16, fan wheel 148 can be configured so as to provide optimal air performance and heat uniformity through the tray portion 106. Generally, fan wheel 148 is defined by a circular perimeter 240 and wheel floor 241 having a top surface 242 and a bottom surface 244. Fan wheel 148 includes a plurality of backward curving impeller blades 246 extending outwardly on both sides of wheel floor 241 that are partially separated by impeller openings 248. Fan wheel 148 further includes an interior solid portion 250 on the wheel floor 241. Wheel floor 241 is vertically spaced on fan wheel 148 to define a top blade height 252 and a bottom blade height 254.

When attached to the motor 146, the backward curved impeller blades 246 are highly efficient for maximizing the amount of air circulated into air supply plenum 212. The interior solid portion 250 functions as a shield to prevent solids or liquids from coming into contact with the motor 146. Impeller openings 248 allow for any differential pressure on the fresh air and recirculated air sides to equilibrate and aids in mixing fresh and recirculated air prior to being directed across the heater assembly 144. Furthermore, impeller openings 248 allow impeller blades 246 on both side of the wheel floor 241 to contribute even if airflow on either the fresh air or recirculated air side in unintentionally obstructed or choked off. Top blade height 252 generally exceeds bottom blade height 254 by an optimized amount so as to achieve the desired ratio of recirculated air to fresh air. For instance, the ratio of top blade height 252 to bottom blade height 254 can be approximately 3:1 so as to maintain maximum performance of the food dehydrator 100.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

The invention claimed is:

1. A food dehydrator comprising:
   a base portion including an upper base surface defining a base central aperture, a base circumferential inner wall, and a base circumferential outer wall, the base circumferential inner wall and the base circumferential outer wall defining a base perimeter channel;
   a carrying tray including a carrying tray upper surface defining a carrying tray central aperture, an interior surface, an upper channel surface having one or more apertures, and an exterior surface defining a carrying tray perimeter channel; and
   a cover portion,
   wherein the carrying tray is configured for liftable placement on the upper base surface of the base portion to define a dehydrating configuration such that the interior surface of the carry tray is proximate to the base circumferential inner wall of the base portion, the exterior surface of the carrying tray is proximate to the base circumferential outer wall, and the carrying tray perimeter channel and the base circumferential perimeter channel align and cooperatively define an air supply plenum, and
   wherein the cover portion is configured for liftable placement on the carrying tray such that the cover portion fluidly encloses the air supply plenum in the dehydrating configuration; and
   wherein the carrying tray is configured upon inversion for liftable placement on the upper base surface of the base portion to define a storage configuration, such that the interior surface of the carrying tray is proximate to the base circumferential inner wall of the base portion, the exterior surface of the carrying tray is proximate to the base circumferential outer wall, and the carrying tray perimeter channel is at least partially nested within the base perimeter channel.

2. The food dehydrator of claim 1, further comprising:
   a tray portion including a tray portion central aperture and a tray portion air supply plenum, wherein the tray portion is configured for liftable placement on the first carrying tray such that the air supply plenum is fluidly engaged with the tray portion air supply plenum and wherein the cover portion is liftably placeable on the tray portion to enclose the tray portion air supply plenum.

3. The food dehydrator of claim 2, wherein the tray portion comprises:
   a second tray having a second tray central aperture and a second tray perimeter channel; and
   a second carrying tray structurally identical to the carrying tray,
   wherein the carrying tray perimeter channel of the second carrying tray and the second tray perimeter channel cooperatively define the tray portion air supply plenum.

4. The food dehydrator of claim 2, wherein the tray portion is individually liftable from the carrying tray such that the air supply plenum remains defined between the base portion and the carrying tray.

* * * * *